(12) United States Patent
Stiehler

(10) Patent No.: US 6,760,544 B1
(45) Date of Patent: Jul. 6, 2004

(54) CAMERA FRAME ASSEMBLY HAVING DOGGED LENS MOUNT AND RECYCLING METHOD

(75) Inventor: Wayne E. Stiehler, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/447,879

(22) Filed: May 29, 2003

(51) Int. Cl.⁷ .............................................. G03B 17/02
(52) U.S. Cl. ........................ 396/6; 396/529; 396/535
(58) Field of Search .......................... 396/535, 6, 440, 396/529

(56) References Cited

U.S. PATENT DOCUMENTS

| 3,782,259 A | 1/1974 | Noble |
| 4,901,097 A | 2/1990 | Vandemoere et al. |
| 5,239,326 A | 8/1993 | Takai |
| 5,285,229 A | 2/1994 | Kamata |
| 5,517,269 A | 5/1996 | Boyd et al. |
| 5,568,218 A | 10/1996 | Dussinger et al. |
| 5,615,395 A * | 3/1997 | Komaki et al. ............... 396/6 |
| 5,721,995 A | 2/1998 | Katsura et al. |
| 5,815,758 A | 9/1998 | Terada |
| 6,208,808 B1 | 3/2001 | DiRisio |
| 6,217,237 B1 | 4/2001 | Ue et al. |
| 6,381,409 B1 | 4/2002 | Aoshima et al. |

FOREIGN PATENT DOCUMENTS

JP   2000-199938   7/2000

* cited by examiner

*Primary Examiner*—David M. Gray
(74) *Attorney, Agent, or Firm*—Robert Luke Walker

(57) ABSTRACT

A camera frame assembly has a frame. A lens mount has one or more hooks that grip the frame. A backer dogs the hooks against the frame. In camera recycling, the hooks are first undogged to provide access. The hooks are then released from the camera frame. Following the releasing, the lens mount is separated from the camera frame. The backer can include a baffle that defines an exposure opening aligned with the optical axis of the lens module.

21 Claims, 7 Drawing Sheets

CAMERA FRAME ASSEMBLY HAVING DOGGED LENS MOUNT AND RECYCLING METHOD

CROSS REFERENCE TO RELATED APPLICATIONS

Reference is made to commonly assigned, co-pending U.S. patent application Ser. No. 10/447,854, entitled: CAMERA ASSEMBLY HAVING A TRAVELER AND PIVOTABLE TURRET DRIVEN BY AN OVER-CENTER MECHANISM, filed May 29, 2003, in the name of Anthony DiRisio, which is hereby incorporated herein by reference.

Reference is made to commonly assigned, co-pending U.S. patent application Ser. No. 10/447,698, entitled: CAMERA ASSEMBLY HAVING TRAVEL STOP, filed May 29, 2003, in the name of Anthony DiRisio, which is hereby incorporated herein by reference.

Reference is made to commonly assigned, co-pending U.S. patent application Ser. No. 10/447,816, entitled: CAMERA ASSEMBLY HAVING FORWARD AND RETURN CAM SURFACES FOR A TURRET ON DIFFERENT PARTS, filed May 29, 2003, in the name of Anthony DiRisio, which is hereby incorporated herein by reference.

Reference is made to commonly assigned, co-pending U.S. patent application Ser. No. 10/447,701, entitled: CAMERA ASSEMBLY HAVING COVERGLASS-LENS ADJUSTER, filed May 29, 2003, in the name of Wayne Stiehler, which is hereby incorporated herein by reference.

Reference is made to commonly assigned, co-pending U.S. patent application Ser. No. 10/447,853, entitled: DEPLOYMENT APPARATUS FOR CAMERAS AND OTHER HAND-HELD DEVICES AND DEPLOYMENT METHOD, filed May 29, 2003, in the name of Michael Roger Allen, Anthony DiRisio, which is hereby incorporated herein by reference.

Reference is made to commonly assigned, co-pending U.S. patent application Ser. No. 10/447,702, entitled: CAMERA ASSEMBLY HAVING OVER-CENTER BIASING OF TRAVELER AGAINST RESTS, filed May 29, 2003, in the name of Anthony DiRisio, which is hereby incorporated herein by reference.

Reference is also made to commonly assigned, co-pending U.S. patent application Ser. No. 10/264,757entitled: MULTIPLE POSITION LENS BARREL HAVING CAM CYLINDER WITH COMMONLY BIASED FIRST AND SECOND LENS CARRIERS, filed Oct. 4, 2002, in the name of Anthony DiRisio.

Reference is also made to commonly assigned, co-pending U.S. Patent application Ser. No.10/324,488, entitled: CAMERA FRAME ASSEMBLY HAVING FOUR-BAR LINKAGE SHUTTER ACTUATOR, filed Dec. 20, 2002, in the name of Anthony DiRisio.

Reference is also made to commonly assigned, co-pending U.S. patent application Ser. No. 10/324,966, entitled: CAMERA LENS MODULE HAVING RECYCLABLE LENS BARREL CAP, filed Dec. 20, 2002, in the name of Anthony DiRisio.

Reference is also made to commonly assigned, co-pending U.S. patent application Ser. No. 10/327,503, entitled: EXTENDABLE LENS CAMERA HAVING MECHANICAL SHUTTER BLOCKING IN INTERMEDIATE LENS POSITION, filed Dec. 20, 2002, in the name of Anthony DiRisio.

Reference is also made to commonly assigned, co-pending U.S. patent application Ser. No. 10/325,507, entitled: CAMERA FRAME ASSEMBLY HAVING SHUTTER THAT SLIDES FORWARD AND BACK WITH ZOOM LENS, filed Dec. 20, 2002, in the name of Anthony DiRisio, David J. Cornell.

Reference is also made to commonly assigned, co-pending U.S. patent application Ser. No. 10/325,553, entitled: CAMERA FRAME ASSEMBLY HAVING SHUTTER ACTUATOR WITH TELESCOPING STRIKER AND METHOD, filed Dec. 20, 2002, in the name of David J. Cornell.

Reference is also made to commonly assigned, co-pending U.S. patent application Ser. No. 10/317,490, entitled: CAMERA FRONT SEAL ASSEMBLY, filed Dec. 12, 2000, in the name Anthony DiRisio.

Reference is also made to commonly assigned, co-pending U.S. patent application No. 10,326,450, entitled CAMERA FRAME ASSEMBLY HAVING INDEPENDENTLY BACK-PIVIOTING DRIVE HUB FOR IMPACT SHUTTER, filed Dec. 20, 2002, in the name of Anthony DiRisio, David J. Cornell.

FIELD OF THE INVENTION

The invention relates to cameras and photography and more particularly relates to a camera frame assembly having a dogged lens mount and recycling method.

BACKGROUND OF THE INVENTION

One-time use cameras are commonly designed for ease of disassembly during recycling. Parts of the one-time-use cameras are commonly held together by hooks, since this makes disassembly easier.

U.S. Pat. No. 5,285,229 discloses a one-time-use cameras, in which hooks are provided as molded-in portions of a one-piece plastic casting. The hooks engage edges of another part. Holes adjoin roots of the hooks. Probes inserted through the holes contact sloped surfaces provided on the hooks and flex the hooks out of engagement with the edges of the other part.

U.S. Pat. No. 6,381,409 discloses a one-time-use camera disassembly method, in which of the cameras have a label covering the holes adjoining the roots of hooks. Probes are pushed through the label into holes and against sloped surfaces of adjoining hooks to flex the hooks and release engagement of two parts.

Hooks like these have been used for many different parts of one-use-time cameras, including taking-lens related components, as is disclosed, for example, in U.S. Pat. Nos. 5,568,218 and 5,721,995.

U.S. Pat. No. 4,901,097 discloses a camera that has a lens shade, which is hooked to the camera shell after assembly of the shell within an outer paper pack The lens shade protrudes from the remainder of the camera and is subject to impacts, but is separated from the taling lens.

In telescoping lens cameras, the taking lens barrel protrudes from the shell or the shell itself protrudes around the taking lens barrel. In the first case, the barrel is directly subject to impacts. In the second case, the barrel is subject to impact forces if the shell flexes. In either case, the resulting force tends to cause flexure of a coupling between the taking lens and the remainder of the camera.

It would thus be desirable to provide camera frame assemblies and recycling methods, in which a protruding component, subject to impacts, can be securely held by easily releaseable hooks.

SUMMARY OF THE INVENTION

The invention is defined by the claims. The invention, in broader aspects, provides a camera frame assembly that has a frame. A lens mount has one or more hooks that grip the frame. A backer dogs the hooks against the frame. In camera recycling, the hooks are first undogged to provide access. The hooks are then released from the camera flame. Following the releasing, the lens mount is separated from the camera frame. The backer can include a baffle that defines an exposure opening aligned with the optical axis of the lens module.

It is an advantageous effect of the invention that improved camera frame assemblies and recycling methods are provided, in which a protruding component is hooked and dogged.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Referring initially to FIGS. 1–4, a camera frame assembly 10 includes a frame 12, a mount 14, and a backer 16. The term "camera frame assembly" is used here to refer to a complete camera or an incomplete camera or subunit of a camera that can be assembled with other parts to form a complete camera.

Figure 3:
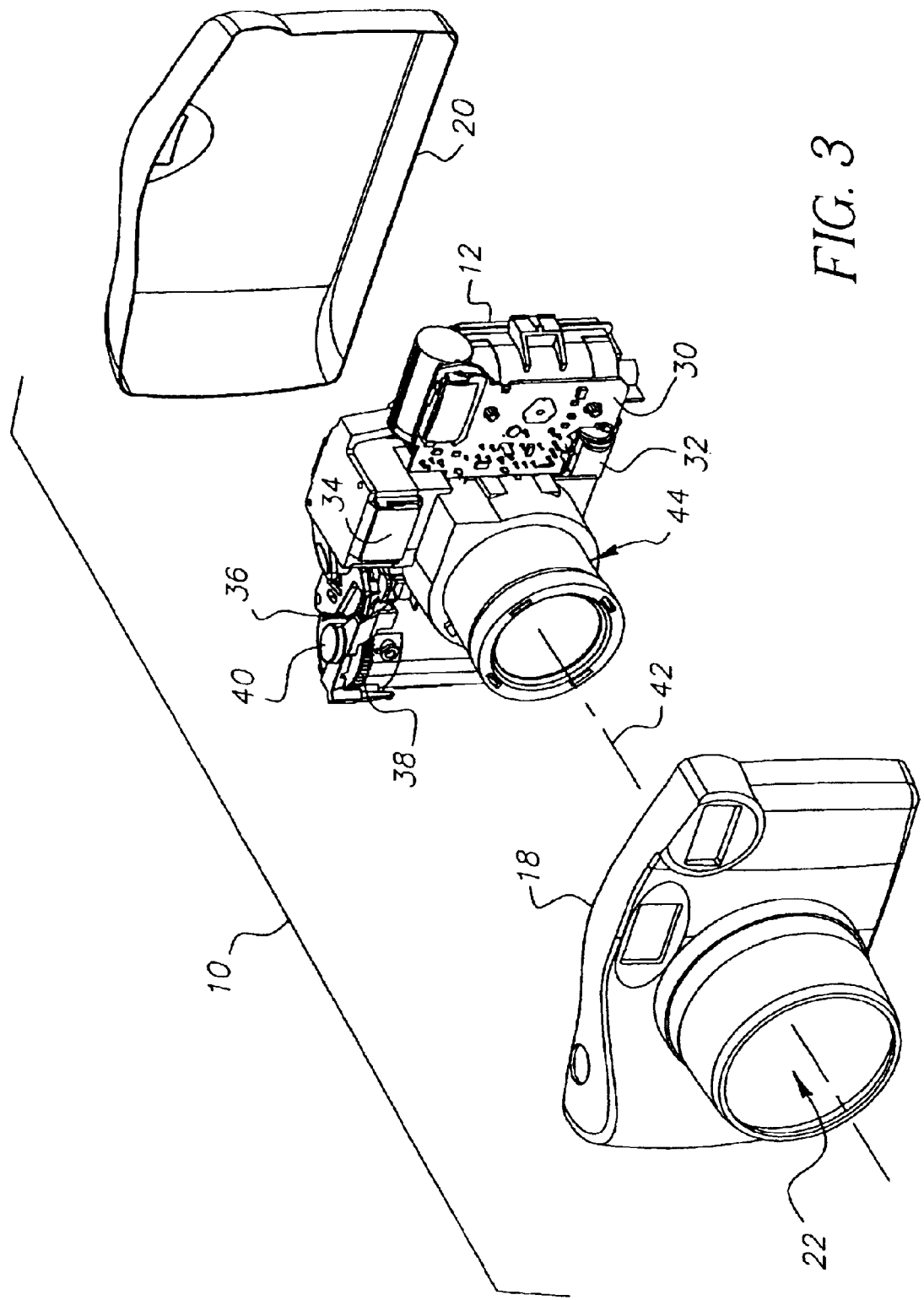
FIG. 3 is a front, partially-exploded perspective view of a camera in that incorporates the camera frame assembly of FIG. 1.

The one-time-use camera shown in FIG. 3 has opposed front and rear covers 18,20 and a frame 12 disposed between the covers 18,20. The covers 18,20 can each be a one-piece plastic casting or can be assemblages of parts. The covers 18,20 are joined to each other and/or to the frame 12, by hooks, or other fasteners (not shown); or adhesive or other bonding, or the like. The front cover 18 has a lens opening 22.

The frame 12, which is preferably a one-piece plastic casting, provides a pair of film chambers 24,26 and a main opening 28 located between the chambers 24,26. A flash unit 30 is joined to the frame 12. The frame 12 holds a battery 32 for the flash unit 30. A viewfinder 34 is supported at the top of the frame 12. A film transport-shutter mechanism 36 is joined to the frame 12. The mechanism 36 includes a thumbwheel 38 and a shutter button 40 and provides mechanical film transport and an impact shutter (not separately illustrated). In the case of digital cameras (not shown), the film transport-shutter mechanism and related features, above discussed, are replaced by an electronic imager and control system and the images are stored to removable or nonremovable memory. The invention is generally described herein in relation to one-time-use cameras that use photographic film, but like considerations apply to reusable film cameras and to one-time-use and reusable digital cameras. The invention is likewise applicable to both still and movie or video cameras. The invention is generally described herein in relation to a lens mount that is part of a lens module 44, but is not limited to such lens mounts. For example, the mount can be part of a viewfinder assembly (not illustrated), rather than a taking lens module 44. In any case, the invention is most advantageous for protruding components that are subject, during use, to a risk of unintended deflection relative to the frame.

The frame 12 defines an optical axis 42 that extends through the lens opening 22. The mount 14 is joined to the frame 12 in alignment with the optical axis 42. In the embodiment illustrated, the mount 14 is part of a telescoping taking lens module 44. The lens module 44 includes two or more lens elements (not shown) that act as a taking lens. One or more of the lens elements are mounted in a lens barrel 46. The barrel 46 is movable along the optical axis 42, between an extended position and a retracted position, relative to the mount 14, which remains fixed in position.

In the illustrated embodiment, the barrel 46 is located within the front cover 18 in both positions. Other front cover designs (not shown) can be used, such that the barrel protrudes through the lens opening in the extended position or in both extended and retracted positions.

Telescoping lens modules are well-known to those of skill in the art and are very often used to provide zoom, that is, to vary focal length. In such lenses, the movable barrel 46 and the mount 14 can be assemblies of a large number of parts.

The viewfinder 34 can have a fixed focal length, but a viewfinder 34 that zooms in the same manner as the lens module 44 is preferred. Such viewfinders and ways of linking movement of telescoping viewfinders and lens barrels are well known to those of skill in the art.

Figure 5:
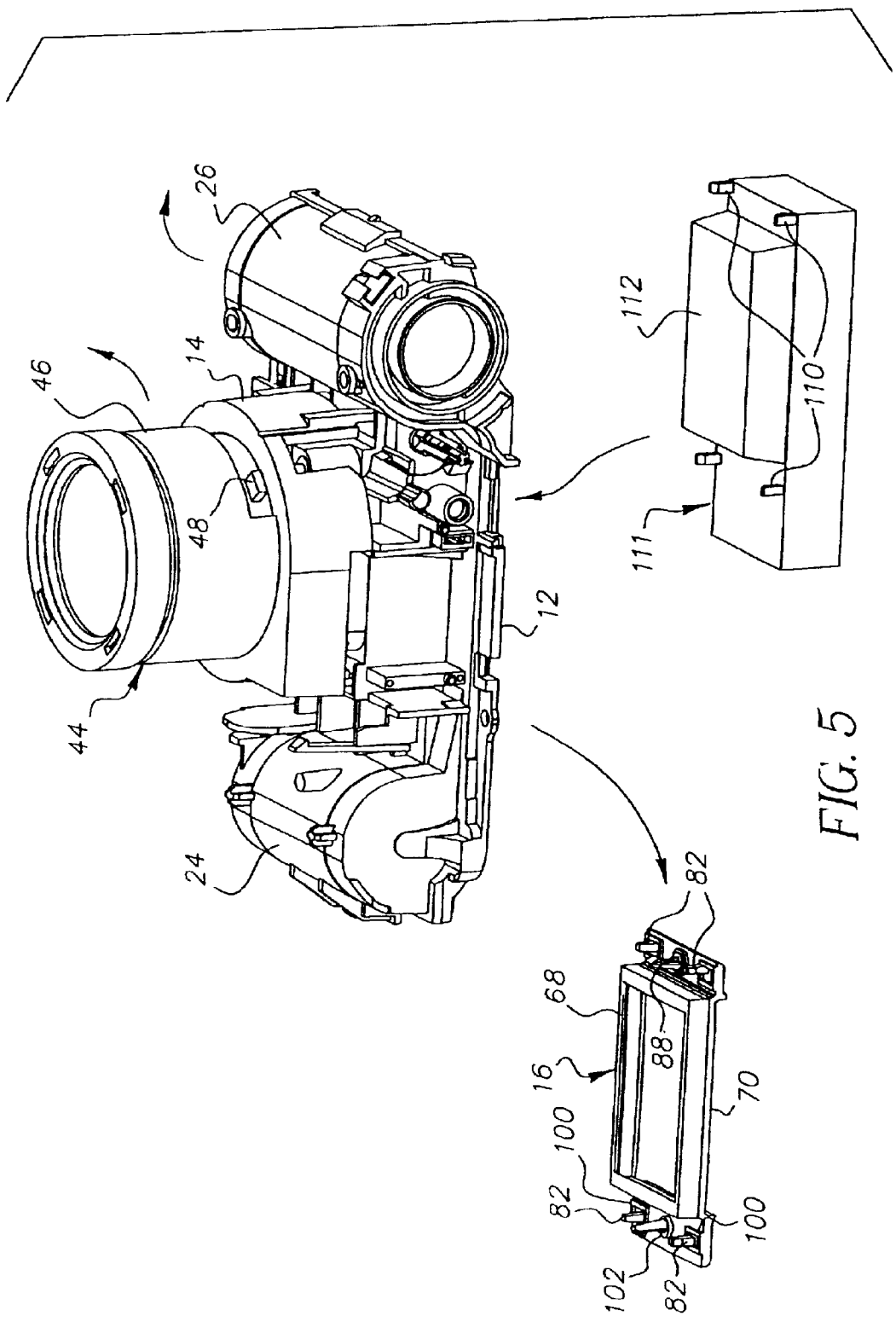
FIG. 5 is a semi-diagrammatical view illustrating disassembly of the backer from the frame and insertion of a tool into the holes in the frame to release the hooks of the lens mount.

The taking lens module 44 has an input part 48 (see FIG. 5) that is moved to change the position of the barrel 46 along the optical axis 42. The input part 48 can be a portion of the barrel 46 or can be a separate component that moves the barrel 46 directly or indirectly. The input part 48 can be moved manually or by a motor (not shown).

The mount 14 has a peripheral wall 50 that is roughly circular or oval, with an upper squared-off corner and a lower verge 52 that extends outward so as to define a plane perpendicular to the optical axis 42. A set of hooks 54 are joined to the peripheral wall 50. In the camera shown in the figures, the hooks 54 are arranged in pairs, on opposite sides of the optical axis 42, and the peripheral wall 50 and hooks 54 are parts of a one-piece plastic casting. The books 54 can be made as separate pieces that are then attached, but that is more complex and is not currently preferred. An attachment stud 56 protrudes from the mount 14 between two of the hooks 54. The stud 56 is received by a hole (not shown) in the circuit board of the flash unit 30 and helps hold the flash unit 30 in position.

The hooks 54 attach the mount 14 to the frame 12. The term "hook" and like terms are used herein to refer to elongate members that have a transversely protruding engagement portion at a free end.

The engagement portions 58 of the hooks 54 engage catch portions 60 of the frame 12. For simplicity in removal, it is currently preferred that the hooks 54 not be recurvate. The hooks 54 are slightly flexible and resiliently bend during release (discussed below in detail).

The camera has four through-holes 62 positioned at the four corners of the rectangular main opening 28 of the frame 12. Each through-hole 62 extends through the frame 12 from the front surface to the back surface. Through-holes 62 can join together, so as to form continuous slots, but are preferably separate from each other.

The hooks 54 grip the frame 12 in alignment with respective through-holes 62. In the embodiment shown in the figures, catch portions 60 of the frame 12 are located within through-holes 62 and the hooks 54 each grip a catch portion 60 within a respective through-hole 62. (See FIG. 6.) The catch portions 60 have flats 64 that receive the engagement portions 58 of the hooks 54. Leading to the flats 64 are inclined surfaces 66 that deflect the engagement portions 58 of the hooks 54 outward during attachment. (After the inclined surfaces 66 are cleared by the continued inward movement of the hooks 54, the engagement portions 58 of the hooks 54 resiliently snap inward to seat against respective catch portions 60.) Edges of the engagement portions 58 can be chamfered complementory to the inclined surfaces 66 or can be filleted or the like to make the deflection of the hooks 54 easier. As an alternative (not shown), catch portions 60 can be provided on the front surface or back surface of the frame 12, rather than in the through-holes 62.

The backer 16 is disposed against the frame 12 opposite the mount 14. The backer 16 includes a baffle 68 that extends into the main opening 28. The rear margin of the baffle 68 is an exposure gate 70 that surrounds and defines an exposure opening 72. The rest of the main opening 28 is blocked by the backer 16. During use, the film (not shown) moves along a film path 74 that extends from the first film chamber 24, across the exposure gate 70, and to the second film chamber 26. Film rails 76 or the like can be provided on the frame 12 (as shown) or on the exposure gate 70 to reduce friction during film travel.

The backer 16 has a pair of opposed flanges 78 that are joined to and extend laterally outward from the baffle 68. The rear faces 80 of the flanges 78 are shaped so as to not interfere with the passage of the film across the exposure gate 70. The rear faces 80 of the flanges 78 shown in the figures are flattened, but the flanges 78 can alternatively be recessed and/or provided with film rails.

The backer 16 includes a set of dogs 82 that extend forward from the backer 16. It is preferred that a dog 82 be provided for each hook 54 of the mount 14 and that the hooks 54 be distributed about the perimeter of the lens module 44. With a circular perimeter, it is convenient if the hooks 54 are evenly distributed. With a rectangular perimeter, as in the illustrated embodiment, it is convenient to provide a hook 54 at each corner. In the illustrate embodiment, a pair of dogs 82 extends forward from the front faces 84 of each of the flanges 78 of the backer 16.

Figure 1:
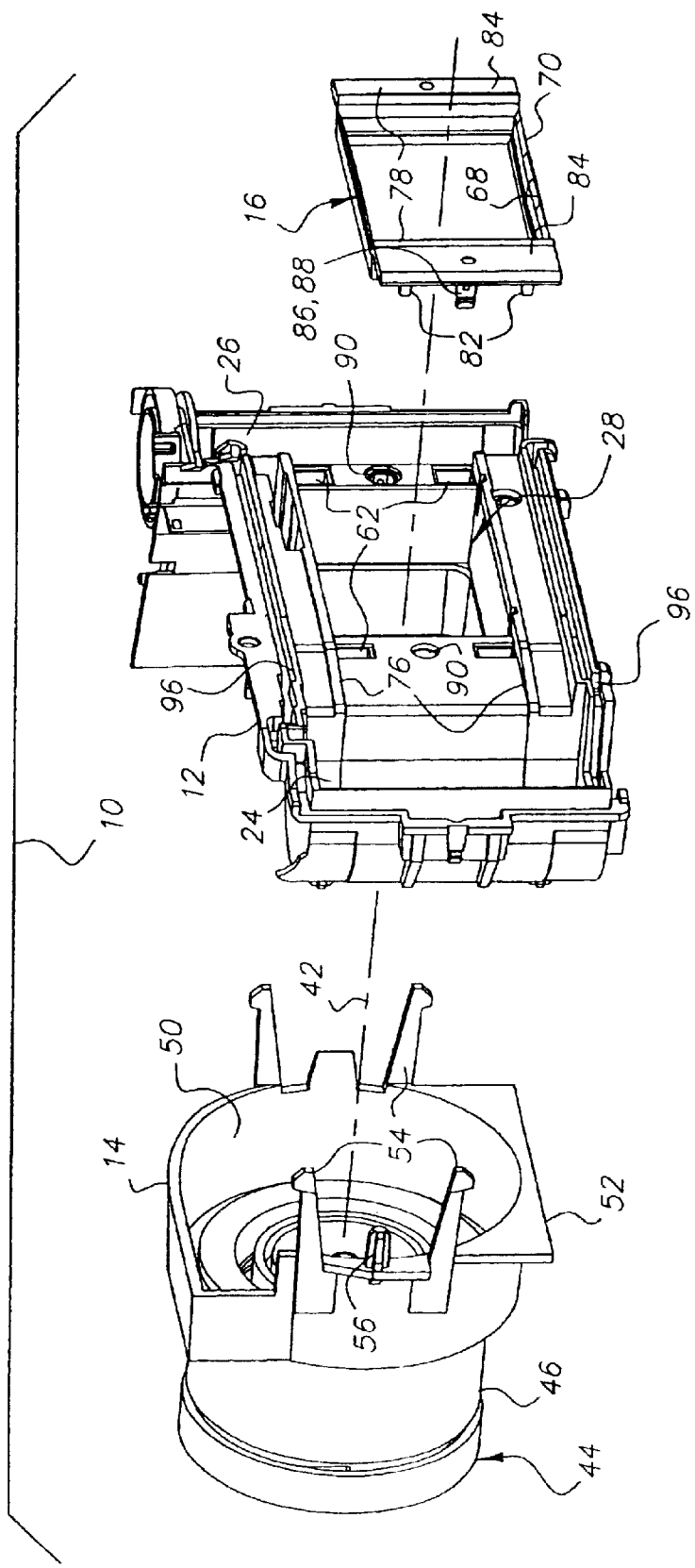
FIG. 1 is a rear, partially-exploded perspective view of an embodiment of the camera frame assembly.
Figure 2:
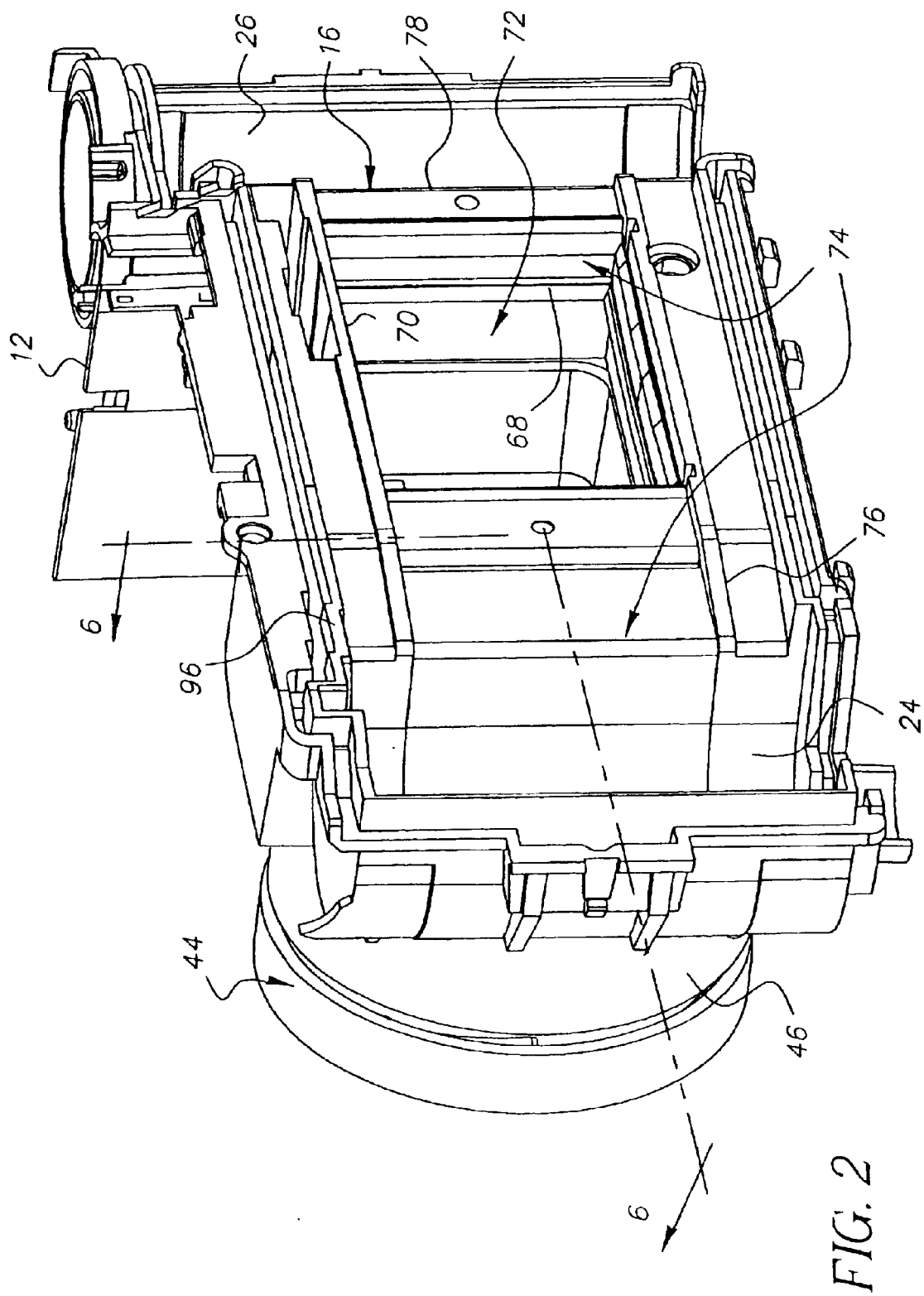
FIG. 2 is a rear perspective view of the camera frame assembly of FIG. 1.

When assembled, as shown in FIG. 2, the hooks 54 of the mount 14 are dogged, that is, held fast by the dogs 82. This fastening of the hooks 54 against respective catch portions 60 deters relative movement of the mount 14 and frame 12, which could cause misalignment of the taking lens and/or light leakage leading to degradation of captured images. Such relative movement of the mount 14 and frame 12 could otherwise occur when impacts against the lens module 44 or cover 18 cause the hooks 54 to bend.

Each dog 82 extends into a respective through-hole 62 and engages a respective hook 54, holding that hook 54 against the frame 12 within the respective through-hole 62. The dogs 82 are preferably wedge shaped, with the taper extending along the longer dimension of the dogs 82. Rectangular dogs 82 can be used, but are not preferred. Wedge-shaped dogs 82 act like wedges to push hooks 54 toward respective catch portions 60. This helps ensure that the hooks 54 are fully seated against the catch portions 60 and can also accommodate hooks 54 that are slightly out of shape and must be bent by the dogs 82 to fully seat against the catch portions 60.

A single dog 82 can be used rather than several dogs 82. Likewise, the dogs 82 can be used without a backer 16. Neither of these approaches is preferred. It is more difficult for a single dog 82 to hold the mount 14 tightly against the frame 12. Dogs 82 used without a backer 16 must be handled individually as separate parts. This is inefficient.

In the illustrated embodiment, an attachment portion 86 of the backer 16 is fastened to the frame 12. This is in addition to and independent of the dogging action of the dogs 82 on the hooks 54. Adhesive, sonic welding, and the like can be used to attach the backer 16 to the frame 12; however, it is preferred that the backer 16 be releasably attached using snap fasteners, hooks, or the like. In the embodiment shown in the figures, the attachment portion 86 is a pair of latchhooks 88. The latchhooks 88 are similar to, but shorter than the hooks 54 of the mount 14. The latchhooks 88 are slightly flexible. Each latchhook 88 is joined to or formed as a part of each of the flanges 78. In that embodiment, two dogs 82 extend forward from each flange 78 and the latchhooks 88 are located between the members of each pair of dogs 82. This location is convenient, in that the dogs 82 are each near a latchhook 88. This helps reduce any possible bending of the backer 16 between the dogs 82 and the latchhooks 88. Such bending would be undesirable, in that it could dislodge the dogs 82.

In the embodiment shown, the through-holes 62 are arranged in pairs on either side of the main opening 28. A receiver 90 for each latchhook 88 is joined to or formed as a part of the frame 12 on either side of the main opening 28, between members of each of the pairs of through-holes 62. The receivers 90 each have an internal catch 92 (shown in FIG. 8) that is comparable to the catch portions 60 earlier discussed. The free ends of the latchhooks 88 each have a protruding engagement portion 94 that engages a respective catch 92, in the same manner that the engagement portions 58 of the hooks 54 of the mount 14 engage the catch portions 60. When assembled, the latchhooks 88 extend forward from the backer 16 and the hooks 54 extend rearward from the mount 14.

In addition to supporting the dogs 82, the flanges 78 can also block light entry to the film path 74 via the through-holes 62. This is convenient, because the front cover 18 can be made non-lighttight and matching parts of the frame 12 can be simplified by eliminating light-locking features. (Light-locking features 96 are provided where the rear cover and frame 12 meet. Illustrated for the frame 12 in FIG. 1.) In the illustrated embodiment, the flanges 78 and frame 12 have corresponding light-lock features 98,100 surrounding the through-holes 62 and adjoining portions of the flanges 78, respectively. The light-lock features 98,100 fit together when the hooks 54 are dogged. The light-lock features 98,100 intermesh so as to form a convoluted path that blocks light entry. As is well known in the art, a tight fit of the light-lock features can be provided but is not necessary for the light blocking function. To further ensure lighttightness, light-locking features 102,104 can be provided on the latch-hooks 88 and receivers 90. Alternatively, the receivers 90 can be blind cavities (not shown).

Figure 4:
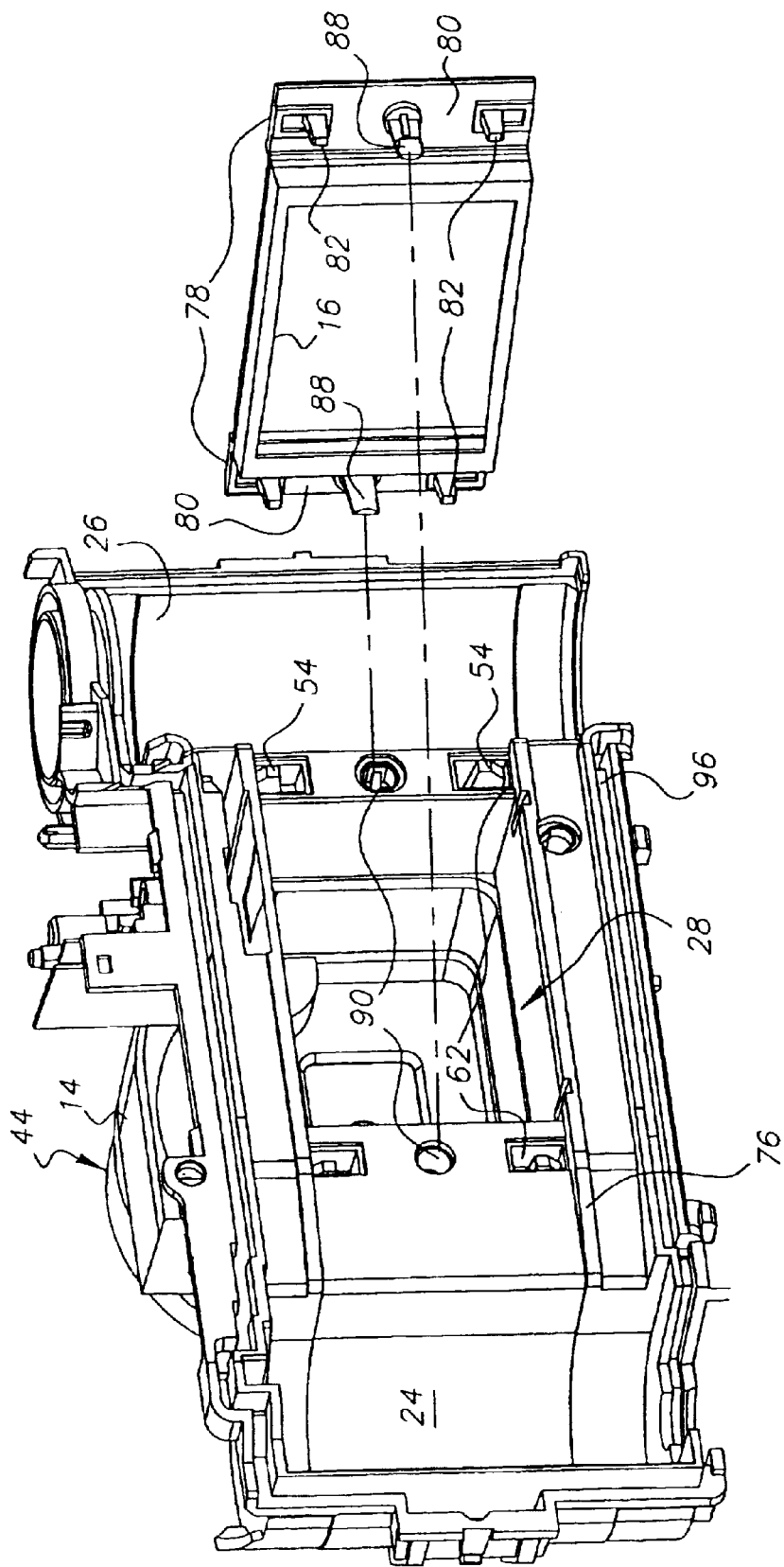
FIG. 4 is a rear perspective view of the camera frame assembly of FIG. 1. The backer is shown detached and rotated relative to the frame. Dot-dashed lines indicate a path of movement of the backer during release or during attachment to a second frame.

The dogs 82 are removable in a direction toward the film path 74 and then outward away from the frame 12, as illustrated in FIG. 4. During recycling, the dogs 82 are removed from respective through-holes 62 in the frame 12. This undogs and provides access to the hooks 54. After the hooks 54 have been released, the lens module 44 is separated from the frame 12. In the embodiment shown in the figures, the dogs 82 are removed by unhooking the backer 16 and then separating the backer 16 from the frame 12.

In the figures, the frame 12 is shown with only the lens module 44 and backer 16 attached. Other components (such as the flash unit 30) can remain attached to the frame 12 at the time the backer 16 and lens module 44 are removed or can be earlier removed, as convenient.

Figure 6:
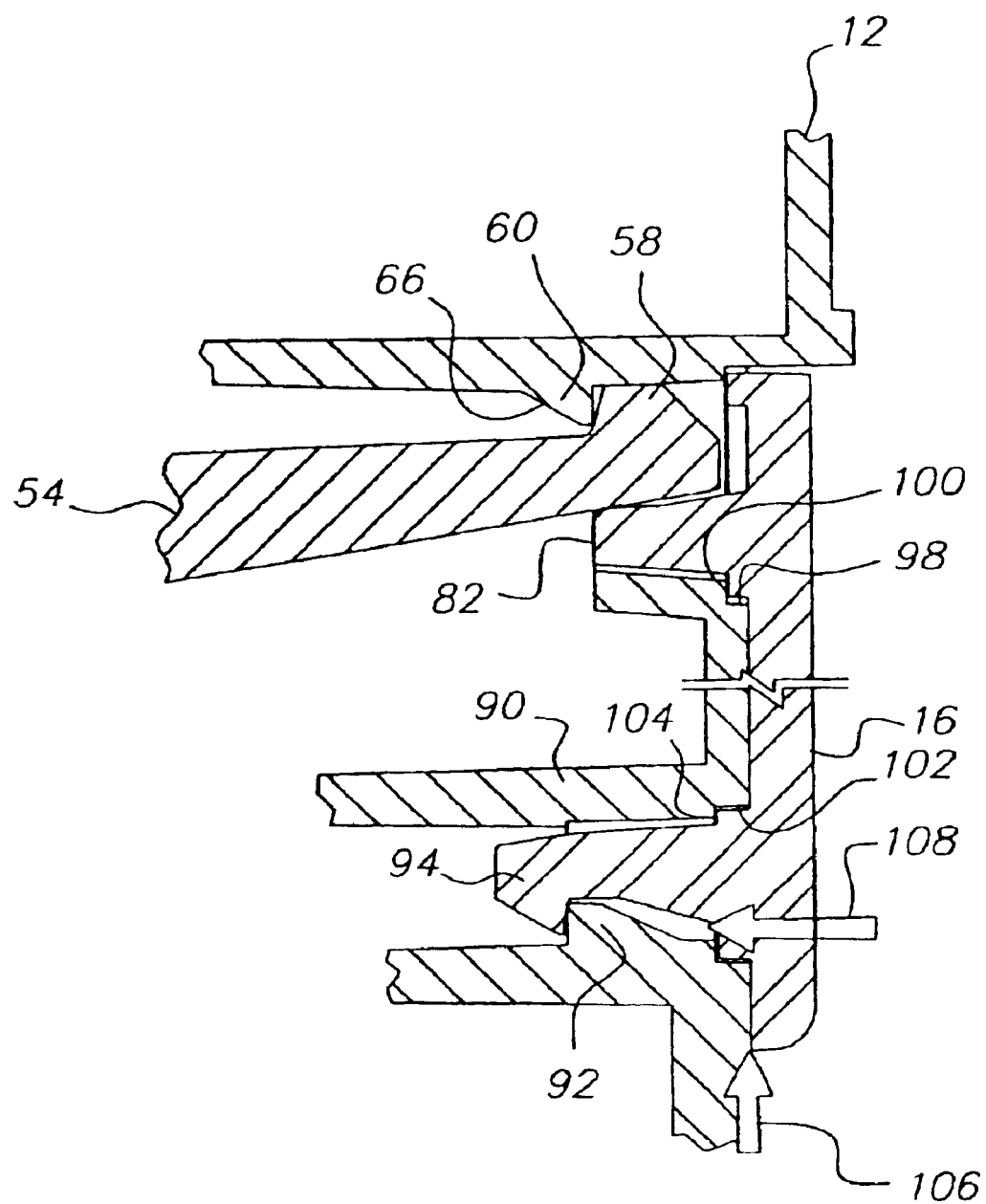
FIG. 6 is a partial cross-sectional view of the camera frame assembly of FIG. 1 taken along the center portion of the line 6—6 of FIG. 2. The backer is booked against the frame. The mount is hooked and dogged against the frame.
Figure 7:
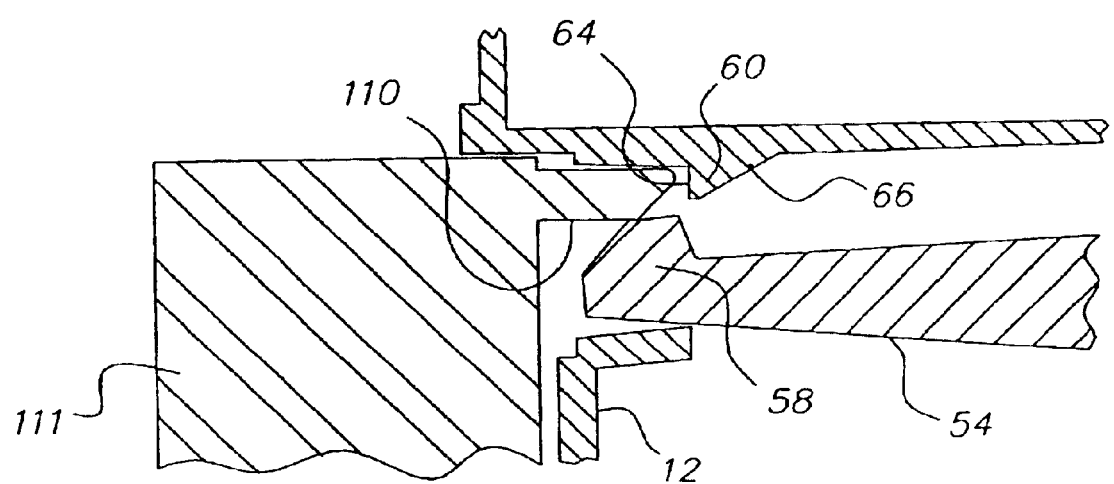
FIG. 7 is the same view as FIG. 6, but during release of the hook from the frame by a tool. Part of the tool is shown.

In the illustrated embodiment, the backer 16 is removed by prying the backer 16 in a rearward direction, as indicated by the arrow 106 in FIG. 6. Alternatively, a probe (not shown) can be inserted, in the direction of arrow 106, and pushed against the latchhook 88 until the latchhook 88 bends away from the respective catch 92. Each of these procedures are repeated, as necessary, for each latchhook 88. As another alternative, a hole (not shown) in the backer 16 can be provided, that opens into the receiver 90 and toward the catch 92. In this case, a probe or pair of probes (indicated by arrow 108 in FIG. 6) are inserted to bend the latchhooks 88 and release the backer 16.

The hooks 54 can be released by inserting a probe 110 into each through-hole 62 and pushing the engagement portion 58 away from the respective catch portion 60 of the frame 12. The probe 110 and the engagement portion 58 can have complementary chamfers or can have fillets or the like, to allow the probe 110 to move more easily along the surface of the engagement portion 58. Two, or preferably, four probes 110 can be combined in a common tool 111. This approach is efficient, since all four hooks 54 can be bent away from the respective catch portions 60 simultaneously. A lead-in 112 can be provided between the probes 110. The lead-in 112 has a tapered shape matched to the exposure opening 72 that helps guide the tool 111 into alignment during insertion.

After disassembly and other intervening steps such as inspection and cleaning, the lens module 44 and backer 16 can be reattached to the same frame 12 or another frame 12 (referred to collectively hereafter as "a second frame"). The module is hooked onto the second frame 12 and is then dogged in place, when the backer 16 is hooked on the second frame 12.

The invention has been described in detail with particular reference to certain preferred embodiments thereof, but it will be understood that variations and modifications can be effected within the spirit and scope of the invention.

What is claimed is:

1. A camera frame assembly comprising:
   a frame;
   a mount having one or more hooks, each said hook gripping said frame; and
   a backer dogging said hooks against said frame,
   wherein said backer has one or more dogs, said dogs each engaging a respective said hook, said dogs being wedge-shaped.

2. The camera frame assembly of claim 1, wherein said backer has an attachment portion that is fastened to said frame near said dogs and hooks.

3. The camera frame assembly of claim 1, wherein said frame has a plurality of through-holes aligned with said hooks.

4. A camera frame assembly comprising:
   a frame;
   a mount having one or more hooks, each said hook gripping said frame; and
   a backer dogging said hooks against said frame;
   wherein said frame has a plurality of through-holes aligned with said hooks, said hooks grip said frame within said through-holes, and said backer has a plurality of dogs, said dogs engaging said hooks within said through-holes.

5. A camera frame assembly comprising:
   a frame defining an optical axis;
   a lens mount disposed in alignment with said optical axis;
   a backer joined to said frame opposite said lens mount, said backer dogging said lens mount against said frame;
   wherein said frame has a plurality of through-holes and said backer has a plurality of dogs extending into said through-holes.

6. The camera frame assembly of claim 5 wherein said lens mount is hooked to said frame.

7. The camera frame assembly of claim 5 wherein said lens mount has a plurality of resiliently bendable hooks, each said hook engaging said frame within a respective one of said through-holes, and said dogs block bending of said hooks.

8. The camera frame assembly of claim 5 wherein said backer has an attachment portion that is fastened to said frame independent of said dogs.

9. The camera frame assembly of claim 5 wherein said backer light-locks said through-holes.

10. The camera assembly of claim 9 wherein said backer has a baffle defining an exposure opening aligned with said optical axis.

11. The camera assembly of claim 5 wherein said backer has a baffle defining an exposure opening aligned with said optical axis.

12. A camera frame assembly comprising:
    a frame defining an optical axis;
    a lens mount disposed in alignment with said optical axis;
    a backer joined to said frame opposite said lens mount, said backer dogging said lens mount against said frame;
    wherein said backer has a baffle defining an exposure opening aligned with said optical axis.

13. The camera frame assembly of claim 12 further comprising a front cover joined to said frame opposite said backer, said front cover being non-lightight.

14. The camera frame assembly of claim 12 wherein said frame has a plurality of though-holes and said backer light-locks said though-holes.

15. A camera frame assembly comprising:
    a frame having a main opening and a film path crossing said main opening, said frame having a plurality of though-holes extending toward said film path;
    a taking lens module aligned with said opening, said taking lens module having a plurality of hooks, each said hook engaging said frame within a respective one of said through-holes;
    a plurality of dogs, each said dog clamping a respective said hook in a respective said though-hole.

16. The camera frame assembly of claim 15 wherein said dogs are removable in a direction toward said film path.

17. The camera frame assembly of claim 15 further comprising baffle joined to said dogs, said baffle being disposed in said main opening, said baffle defining an exposure opening at said film path.

18. A camera recycling method comprising the steps of:
   undogging a plurality of hooks, said hooks being part of a mount;
   during said undogging, providing access to said hooks;
   following said providing, releasing said hooks from a camera frame; and
   following said releasing, separating said mount said camera frame.

19. The method of claim 18 wherein said undogging further comprises removing a plurality of dogs from a plurality of though-openings in said camera frame.

20. The method of claim 19 further comprising unhooking a backer from said camera frame during said undogging, said backer including said dogs.

21. The method of claim 18 further comprising following said separating, attaching and dogging said mount to a second frame.

* * * * *

UNITED STATES PATENT AND TRADEMARK OFFICE
CERTIFICATE OF CORRECTION

PATENT NO. : 6,760,544 B1
DATED : July 6, 2004
INVENTOR(S) : Wayne E. Stiehler

It is certified that error appears in the above-identified patent and that said Letters Patent is hereby corrected as shown below:

<u>Column 8,</u>
Line 54, after "being" delete "non-lightight" and insert -- non-lighttight --

Signed and Sealed this

Third Day of May, 2005

JON W. DUDAS
*Director of the United States Patent and Trademark Office*